E. C. MADDEN.
WHEEL.
APPLICATION FILED JUNE 16, 1914.
1,122,620.
Patented Dec. 29, 1914.
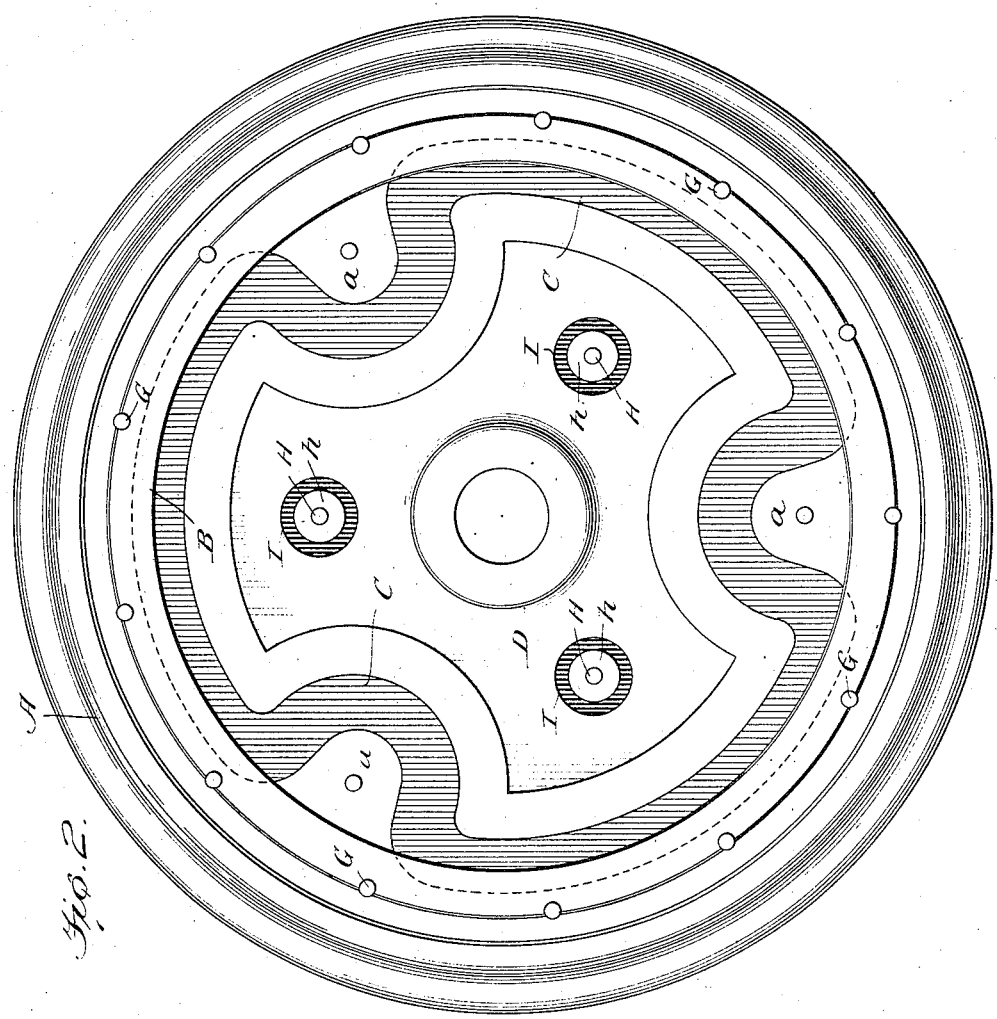
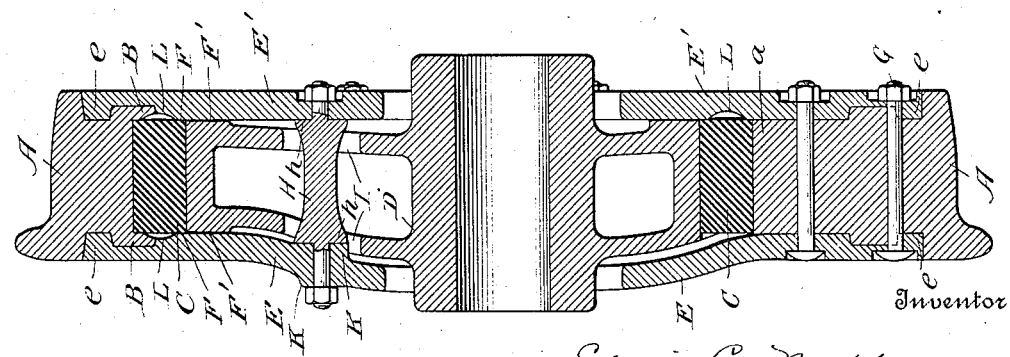
Witnesses
Halbert P. Brown.
Thomas Durant
Inventor
Edwin C. Madden
By Church & Church
Attorney

UNITED STATES PATENT OFFICE.

EDWIN C. MADDEN, OF NEW YORK, N. Y.

WHEEL.

1,122,620.  Specification of Letters Patent.  Patented Dec. 29, 1914.

Application filed June 16, 1914.  Serial No. 845,464.

*To all whom it may concern:*

Be it known that I, EDWIN C. MADDEN, a citizen of the United States, residing at New York, in the county and State of New York, have invented certain new and useful Improvements in Wheels; and I do hereby declare the following to be a full, clear, and exact description of the same, reference being had to the accompanying drawings, forming part of this specification, and to the figures and letters of reference marked thereon.

The present invention relates to improvements in vehicle wheels, and more particularly wheels for use on railway cars of various kinds, where it is desired to reduce as far as possible the noise incident to the progress of the vehicle over the track.

The invention is designed as an improvement upon the structure set forth in my prior Patent No. 783,294, dated February 21, 1905, the object of the present invention being to simplify and improve the construction of the wheel, whereby its strength will be increased, the cost of manufacture reduced, and the wheel rendered generally more efficient for sound deadening purposes and adapted for a greater range of usefulness in connection with cars designed for widely different purposes.

Referring to the accompanying drawings,—Figure 1 is a section in a plane longitudinally of the axis through a wheel embodying the present improvements. Fig. 2 is an elevation with one of the face plates removed.

Like letters of reference in both figures indicate the same parts.

The wheel embodies in its construction a rim A, the peripheral contour of which is of the well known flange form designed for traveling on rails and may, of course, be modified in accordance with approved practice. This rim is provided on its inner face with a series of curved, inwardly extending projections *a*, preferably three in number, as in the patent hereinbefore referred to, and between said projections the inner face of the rim is of segmental form, constituting broad and relatively long bearing faces for the non-resonant material which is adapted to seat against the inner face of the rim throughout its entire area. Between the projections *a* the arc-shaped portions of the rim are provided with inwardly extending flanges B forming arc-shaped channels, as it were, within which the non-resonant material will be confined. This non-resonant material is indicated in the drawings at C and preferably consists of vulcanized rubber, which is made to conform accurately to the contour of the inner face of the rim and to extend around the projections *a* hereinbefore referred to. The non-resonant material forms, as it were, a lining within the rim, and an irregularly shaped cavity or chamber within which will fit a correspondingly shaped center or hub section indicated generally by the reference letter D. The center or hub section receives the axle of the vehicle and its periphery corresponds in shape to the inner face of the rim, whereby the non-resonant material is confined between broad flat surfaces, and while preventing the transmission of sound vibrations from the rim to the hub, it may be made sufficiently dense to give the desired rigidity to the wheel. Relatively angular movement of the rim and center or hub section is prevented by the large inwardly extending projections *a* which interlock with the outwardly extending segmental projections of the center section.

For keeping the rim and center section in position and confining the non-resonant material against movement longitudinally of the axis of the wheel, the rim is provided with side or face plates on the inner and outer sides, such face plates being interlocked with the rim at their outer edges and extended inwardly so as to embrace the center section. Their inner portions are rigidly connected by stay bolts which pass through the center section but are spaced therefrom so as to prevent contact between the bolts and center section, even should the non-resonant material be irregularly compressed by the load or traffic conditions.

The face plates referred to are designed not only to hold the parts in accurate relation, in respect to relative movement longitudinally of the axle, but to give increased strength to the rim section of the wheel, and in order to effectually interlock the outer edges of the plates with the rim the latter is provided on its opposite sides with annular recesses for the reception of annular projections *e* at the outer edges of the plates E and E'. The projections *e* are tapered in cross section to fit in the correspondingly shaped recesses and they are formed to fit around the flanges B before referred to, with their inner faces at F substantially radial throughout those portions where the inner section B bears against the same, thus providing for a limited radial movement of the parts with relation to each other when subjected to a load tending to compress the non-resonant material C. In the preferred construction, the inner section is provided with comparatively narrow radial bearing faces at F', the portions of the plates on the inner side of said radial bearing faces being spaced away from the center section, thus all frictional resistance to the movement of the parts upon each other is confined to a comparatively small area, and the area through which sound vibrations may be transmitted is correspondingly reduced. The plates E and E' are both at their outer edges firmly and rigidly bolted to the rim section by through-bolts G, and their inner portions are rigidly connected by stay bolts H, which latter pass freely through relatively large openings I in the center or hub section so as not to contact therewith under any conditions of use. The stay bolts H are preferably shouldered at h, and, inasmuch as in the preferred construction the plate E is dished or curved to conform to the face contour of the curved side of the center section D, straight or radial faced lugs or projections K are provided at the points where the stay bolts H extend through the plate. With this construction the stay bolts are arranged parallel with the axis and assure the maximum rigidity of the two connected plates.

Where it is desired that increased resiliency shall be afforded, in addition to the sound deadening effect of the non-resonant material, provision is made for permitting of the expansion of the material when under compression, and this provision is preferably in the form of curved recesses L in the face plates E and E' at the sides of the non-resonant material C. These curved recesses are endless and follow the conformation of the non-resonant material, which is of the shape shown in Fig. 2, and are preferably of less width than the thickness of such material, thus leaving shoulders at the corners of the material which will effectually retain it in position and resist the permanent deformation of the same under excessive and long continued loads.

From the foregoing it will be noted that the wheel of the present invention presents little or no opportunity for the transmission of sound vibrations from the rim to the center hub section and, inasmuch as the side plates and rim are rigid with each other and of a non-resonant character, coupled with the deadening effect as to sound vibrations caused by the non-resonant material C, there will be little or no local sound vibrations set up in the rim and face plates. The areas of direct metallic contact are comparatively small, as indicated at F', and slight clearness is preferably left at this point so as to prevent any sticking or binding of the parts when moved radially with relation to each other, during the progress of the vehicle over the tracks. This clearance will prevent the transmission of sound vibrations from one part to the other, and any vibrations which are transmitted will be of a non-objectionable character.

Having thus described my invention, what I claim as new and desire to secure by Letters Patent is,—

1. A wheel for preventing the transmission of sound vibration between the road and the vehicle body, embodying a flanged rim having inwardly extending plates on opposite sides of and rigid therewith, said plates having radial bearing faces in proximity to the rim, a center hub section having a peripheral contour substantially conforming to the contour of the inner face of the rim and spaced therefrom and also having narrow radial faces opposing the radial faces of the plates, there being spaces between the inner portions of the plates and center section, and non-resonant material interposed in the space between the periphery of the center section and inner face of the rim.

2. A wheel for preventing the transmission of sound vibration between the road and the vehicle body, embodying a flanged rim having inwardly extending plates on opposite sides of and rigid therewith, said plates having radial bearing faces on the inside, a center hub section having a peripheral contour substantially conforming to the contour of the inner face of the rim and spaced therefrom, said center section having radial faces opposed to the radial faces of the plates and transverse openings therethrough between the periphery and hub, stay bolts extending through said openings, spaced from the walls thereof and rigidly connecting the inner portions of the plates, and non-resonant material confined in the space between the periphery of the center section and inner face of the rim.

3. A wheel for preventing the transmission of sound vibrations between the road and vehicle body, embodying a flanged rim having inwardly extending plates on its opposite sides with the major portion of its inner peripheral face concentric, said concentric portion being separated by inwardly curved projections, and said plates having recesses in their inner faces conforming in outline to the contour of the inner face of the rim, a center or hub section having a peripheral contour corresponding to the contour of the inner face of the rim and spaced therefrom, and a resilient non-resonant material interposed between the periphery of the center or hub section and said inner face of the rim, in position to expand to the recesses in the inner faces of the plates.

4. A wheel for preventing the transmission of sound vibrations, embodying a center or hub section having peripheral radial side bearing surfaces and having the major portion of its periphery concentric with inwardly curved recesses between the adjacent ends of the concentric portions, a rim having its inner face conforming to the peripheral contour of the center section and spaced therefrom, with flanges extending inwardly on each side of the concentric portions, a non-resonant material interposed between the inner face of the rim and periphery of the center section and confined between said flanges, and face plates rigidly connected with the rim and extending inwardly over the flanges and embracing the opposite bearing faces of the center or hub section.

5. A wheel for preventing the transmission of sound vibrations embodying a center section having relatively large apertures there-through parallel with the axis, a rim, non-resonant material interposed between the rim and center section, face plates rigidly connected at their outer edges with the rim and extending inwardly on the opposite sides of the center section, and stay bolts rigidly connecting said face plates and extending freely through the said relatively large openings in the center section.

EDWIN C. MADDEN.

Witnesses:
E. T. ROCHE,
ANNA BETKE.